(12) United States Patent  
Simpson

(10) Patent No.: US 10,393,263 B2  
(45) Date of Patent: Aug. 27, 2019

(54) REBUILD KIT FOR A CVT CLUTCH SPIDER

(71) Applicant: Don Simpson, Phoenix, AZ (US)

(72) Inventor: Don Simpson, Phoenix, AZ (US)

( * ) Notice: Subject to any disclaimer, the term of this patent is extended or adjusted under 35 U.S.C. 154(b) by 27 days.

(21) Appl. No.: 15/644,163

(22) Filed: Jul. 7, 2017

(65) Prior Publication Data

US 2018/0080554 A1    Mar. 22, 2018

Related U.S. Application Data

(60) Provisional application No. 62/396,008, filed on Sep. 16, 2016.

(51) Int. Cl.
*F16H 55/56* (2006.01)
*F16H 63/06* (2006.01)

(52) U.S. Cl.
CPC .......... *F16H 63/067* (2013.01); *F16H 55/563* (2013.01); *F16H 55/566* (2013.01)

(58) Field of Classification Search
CPC ............. F16H 55/563; F16H 61/66245; F16H 62/067; F16H 55/56; F16H 61/66227
USPC .......................................................... 474/14
See application file for complete search history.

(56) References Cited

U.S. PATENT DOCUMENTS

| | | | | |
|---|---|---|---|---|
| 3,280,648 A | * | 10/1966 | Nelson .............. | F16H 61/66245 474/14 |
| 3,608,387 A | * | 9/1971 | Fox ...................... | F16H 55/563 474/14 |
| 3,733,918 A | * | 5/1973 | Domaas ................ | F16H 55/563 192/105 C |
| 3,759,111 A | * | 9/1973 | Hoff ...................... | F16H 55/563 474/14 |
| 3,861,229 A | * | 1/1975 | Domaas ................ | F16H 55/563 474/14 |
| 4,027,544 A | * | 6/1977 | Kobayashi ............ | F16H 55/563 474/14 |
| 4,313,728 A | * | 2/1982 | Prasad .................. | F16H 55/563 192/105 CD |
| 4,464,144 A | * | 8/1984 | Kobayashi ............ | F16H 55/563 474/11 |
| 4,575,363 A | * | 3/1986 | Burgess ................ | F16H 55/563 474/14 |
| 4,976,550 A | * | 12/1990 | Shobert ................. | F16C 33/201 384/298 |
| 5,209,703 A | * | 5/1993 | Mastine ................ | F16H 55/563 474/14 |

(Continued)

*Primary Examiner* — Henry Y Liu
(74) *Attorney, Agent, or Firm* — Schmeiser, Olsen & Watts LLP

(57) ABSTRACT

A rebuild kit for a spider assembly of a CVT clutch is provided. The rebuild kit includes two non-rotating washers, a roller for each location on a spider. The spider may have wear that is over an acceptable amount of wear determined by the manufacturer. The rebuild kit further includes a pin that couples the two non-rotating washers and the roller between the non-rotating washers within the spider. The roller is engaged by a flyweight of the CVT clutch and the non-rotating washers prevent additional wear of the spider while maintaining the roller aligned with the flyweight during operation of the CVT clutch. The rebuild kit may also include an insert within an aperture of the roller, wherein the insert has high temperature resistance, a low coefficient of friction and non-adhesive properties.

18 Claims, 6 Drawing Sheets

(56) References Cited

U.S. PATENT DOCUMENTS

| | | | | |
|---|---|---|---|---|
| 5,326,330 A * | 7/1994 | Bostelmann | F16H 55/563 | 474/13 |
| 5,562,555 A * | 10/1996 | Peterson | F16H 55/563 | 192/105 CD |
| 5,647,810 A * | 7/1997 | Huddleston | F16C 13/006 | 192/105 CD |
| 5,665,825 A * | 9/1997 | Davies | C08L 27/18 | 525/189 |
| 5,692,983 A * | 12/1997 | Bostelmann | F16H 55/563 | 474/14 |
| 5,797,816 A * | 8/1998 | Bostelmann | F16H 55/563 | 474/14 |
| 6,149,540 A * | 11/2000 | Johnson | F16H 9/18 | 474/14 |
| 6,216,761 B1 * | 4/2001 | Downie | B05C 1/003 | 118/101 |
| 6,318,898 B1 * | 11/2001 | Ward | C23C 28/00 | 384/492 |
| 6,334,826 B1 * | 1/2002 | Takagi | F16H 55/563 | 474/12 |
| 6,346,056 B1 * | 2/2002 | Nouis | F16H 61/66272 | 474/14 |
| 6,656,068 B2 * | 12/2003 | Aitcin | F16H 9/125 | 474/12 |
| 6,733,406 B2 * | 5/2004 | Kitai | F16H 55/56 | 474/13 |
| 6,811,504 B2 * | 11/2004 | Korenjak | F01B 1/12 | 474/13 |
| 6,958,024 B2 * | 10/2005 | Takano | F16H 55/563 | 474/12 |
| 9,267,580 B2 * | 2/2016 | Aitcin | F16H 9/125 | |
| 9,644,717 B2 * | 5/2017 | Aitcin | F16H 55/56 | |
| 2010/0243112 A1 * | 9/2010 | Wright | C22C 9/06 | 148/686 |
| 2014/0349792 A1 * | 11/2014 | Aitcin | F16H 9/125 | 474/13 |

* cited by examiner

REBUILD KIT FOR A CVT CLUTCH SPIDER

CROSS REFERENCE TO RELATED APPLICATION[S]

This application claims priority to U.S. Provisional patent application entitled "REBUILD KIT FOR A CVT CLUTCH SPIDER," Ser. No. 62/396,008, filed Sep. 16, 2016, the disclosure of which is hereby incorporated entirely herein by reference.

BACKGROUND OF THE INVENTION

Technical Field

This invention relates generally to a continuous variable transmission clutch and more particularly to a rebuild kit for a spider assembly of a continuous variable transmission clutch.

State of the Art

A continuous variable transmission ("CVT") clutch ("CVT clutch") is commonly used in off-road vehicles such as, but not limited to, UTVs, ATVs, snowmobiles, and the like. A CVT varies ratio based on vehicle speed, engine RPM or load. The CVT is designed to operate at optimal power for varying vehicle driving conditions. In operation a primary clutch includes a stationary sheave and a moveable sheave. The moveable sheave utilizes fly weights to move the moveable sheave toward and away from the stationary sheave in order to engage and disengage the drive belt.

Primary clutches include a spider assembly formed of a spider with rollers and washers that are engaged by the fly weights to allow the moveable sheave to move. These rollers and washers of the spider assembly often fail and require repair. The current repair or rebuild kits lack in their abilities to repair the worn rollers and washers of a spider assembly of a CVT clutch and further lack the ability to replace rollers when the spider has worn beyond a predetermined dimension.

Accordingly, there is a need in the field of CVT clutches for an improved roller and washer for a spider assembly for repairing OEM worn roller and washer of spider assembly of a CVT clutch.

SUMMARY OF THE INVENTION

The present invention relates to a rebuild kit for use with a spider of a CVT clutch that allows for rebuilding the rollers that engage flyweights of the CVT clutch, regardless of whether the spider is worn beyond manufacturer required tolerances.

An embodiment includes a rebuild kit for a spider assembly of a CVT clutch, the rebuild kit comprising: two non-rotating washers; a roller; and a spider having wear that is over an acceptable amount of wear determined by the manufacturer, wherein: a pin couples the two non-rotating washers and the roller between the non-rotating washers within the spider; and the roller is engaged by a flyweight of the CVT clutch and the non-rotating washers prevent additional wear of the spider while maintaining the roller aligned with the flyweight during operation of the CVT clutch.

Another embodiment includes a rebuild kit for a spider assembly of a CVT clutch, the rebuild kit comprising: two washers; a roller formed with a wear resistant material; and a spider, wherein: a pin couples the two washers and the roller between the washers within the spider; and the roller is engaged by a flyweight of the CVT clutch and the non-rotating washers prevent additional wear of the spider while maintaining the roller aligned with the flyweight during operation of the CVT clutch.

Yet another embodiment includes a rebuild kit for a spider assembly of a CVT clutch, the rebuild kit comprising: two washers; a roller formed with a wear resistant material; an insert having high temperature resistance, a low coefficient of friction and non-adhesive properties, wherein the insert is coupled within an aperture of the roller; a spider, wherein: a pin couples the two washers and the roller with the insert between the washers within the spider; and the roller is engaged by a flyweight of the CVT clutch and the non-rotating washers prevent additional wear of the spider while maintaining the roller aligned with the flyweight during operation of the CVT clutch.

The foregoing and other features and advantages of the present invention will be apparent from the following more detailed description of the particular embodiments of the invention, as illustrated in the accompanying drawings.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

DETAILED DESCRIPTION OF EMBODIMENTS OF THE INVENTION

As discussed above, embodiments of the present invention relate to a rebuild kit for use with a spider of a CVT clutch that allows for rebuilding the rollers that engage flyweights of the CVT clutch, regardless of whether the spider is worn beyond manufacturer required tolerances.

Figure 1:
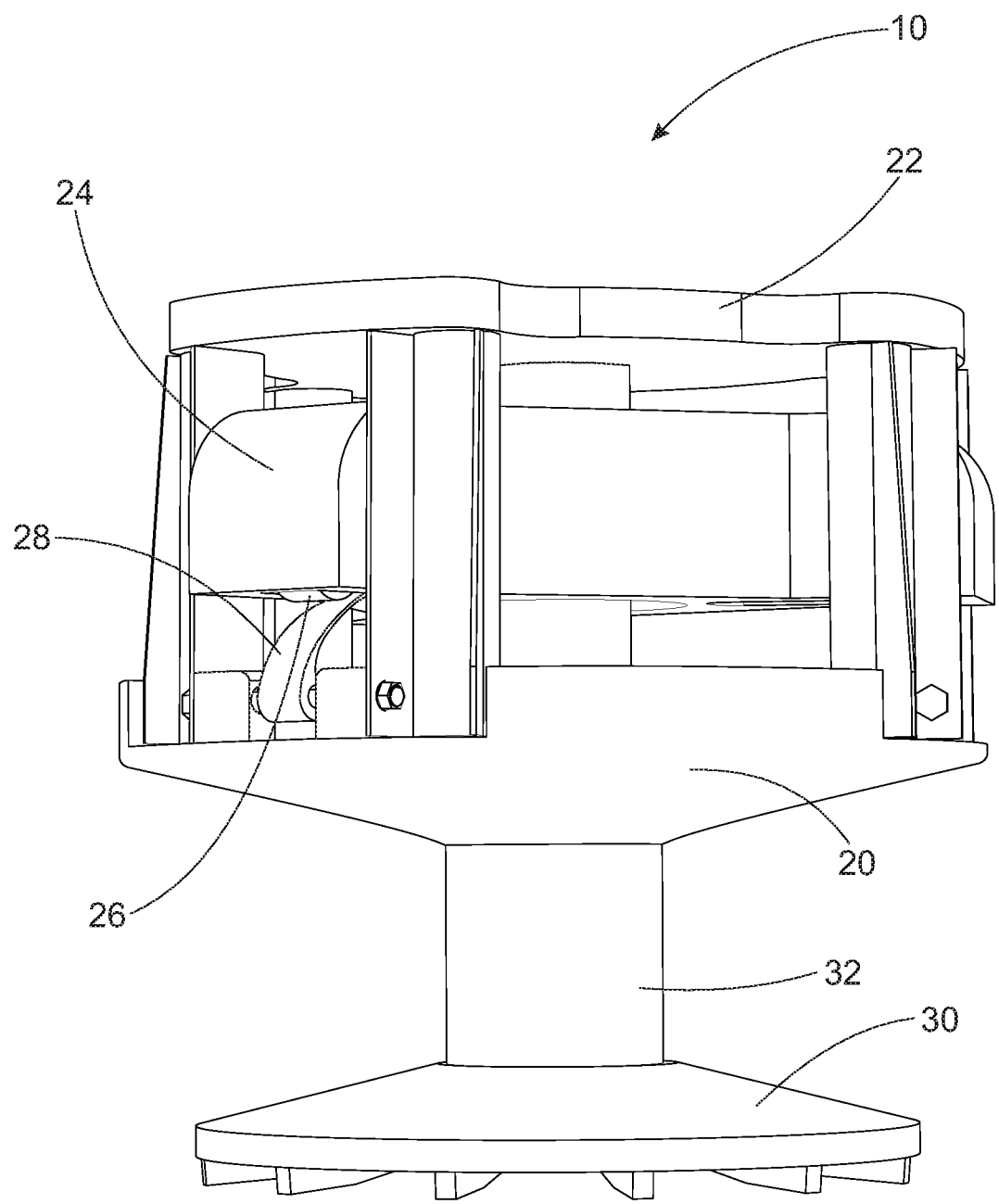
FIG. 1 is a perspective view of a CVT clutch in accordance with an embodiment.
Figure 2:
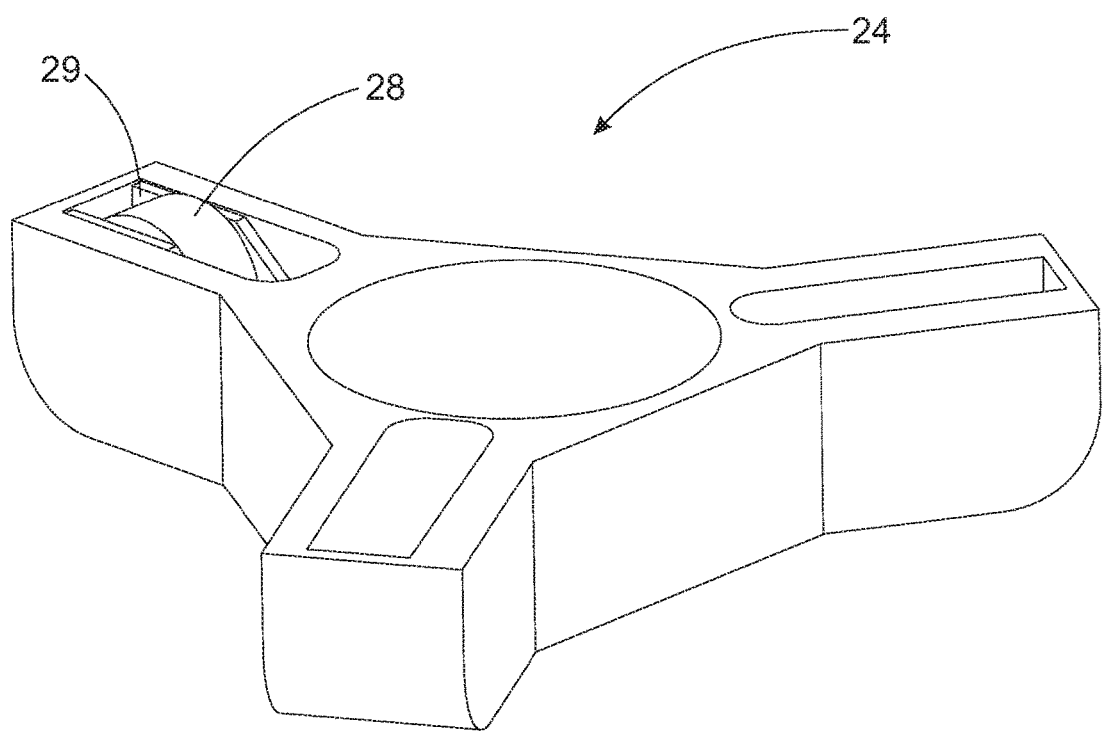
FIG. 2 is a perspective view of a rebuild kit coupled to a spider in accordance with an embodiment.
Figure 3:
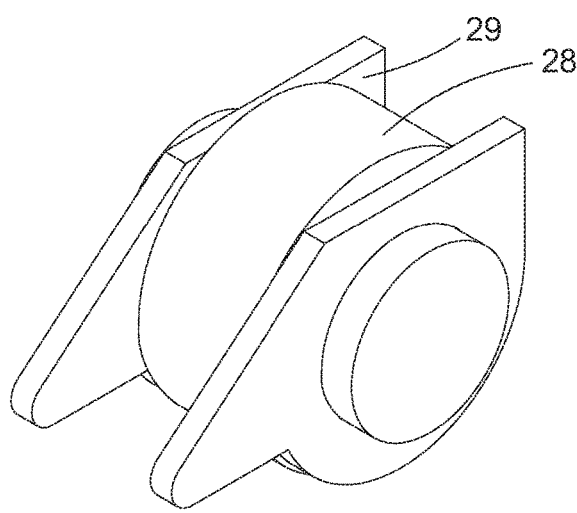
FIG. 3 is a perspective view of a rebuild kit for a spider assembly in accordance with an embodiment.
Figure 4:
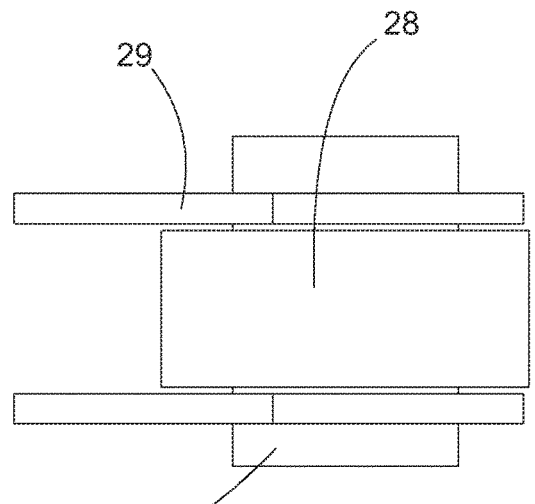
FIG. 4 is a top view of a rebuild kit for a spider assembly in accordance with an embodiment.
Figure 5:
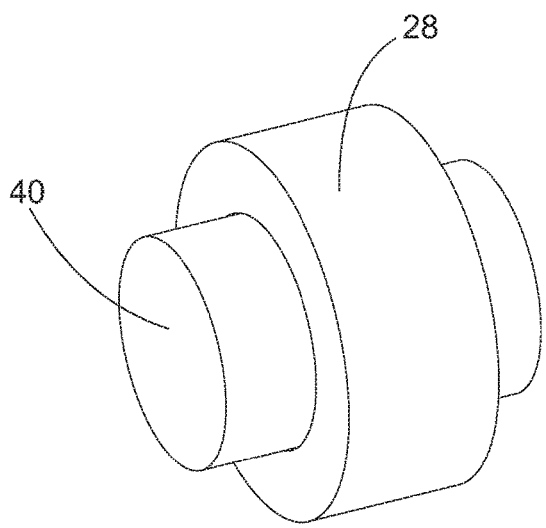
FIG. 5 is a perspective view of roller of a rebuild kit in accordance with an embodiment.

FIG. 1 depicts an embodiment of a CVT clutch 10. The clutch 10 may include a moveable sheave 20, a cover plate 22, a spider 24, flyweights 28, rollers 26, a fixed sheave 30 and an axle 32. In operation, as the engine increases its speed, the rotation of the clutch 10 provide centrifugal force to rotate the flyweights 28 against rollers 26 and moves the spider 24. This in turn moves the moveable sheave 20 toward and away from the fixed sheave 30 along axle 32 in order to operate a CVT. This operation creates wear on the rollers 26 and on the spider 24. As these parts wear, the clutch 10 no longer operates at its fully efficiency and further may result in operation issues of the clutch. It becomes necessary to rebuild the spider assembly in order to correct any issues in clutch 10 operation.

Referring additionally to FIGS. 2-7, a rebuild kit for a CVT clutch spider may include a roller 28, two non-rotating washers 29, that may be coupled to the existing spider 24 with a pin 40. In embodiments, the spider 24 may have wear that is over an acceptable amount of wear determined by the manufacturer. In some embodiments, the manufacturer indicates that 0.015 inch of wear and over, as measured from the surface of the spider wear pad and an adjoining tower, is no longer useable. The manufacturer recommends that a fix to this issue is to replace the entire clutch assembly that includes the spider 24, the rollers 28 and the washers 29 attached to the spider 24 with the pin 40. The pin 40 couples the two non-rotating washers 29 and the roller 28 between the non-rotating washers 29 within the spider 24. This allows the roller 28 to be engaged by a flyweight 26 of the CVT clutch and the non-rotating washers prevent additional wear of the spider while maintaining the roller aligned with the flyweight during operation of the CVT clutch. The rollers 28, washers 29 and pin 40 operate as a moveable friction reducer allowing the flyweights 26 to open and close the CVT clutch 10 during operation.

The roller 28 includes an aperture extending through the roller that is coaxial with the roller 28. The aperture operates to receive the pin 40 there through to couple the roller to the spider 24. Further, the roller 28 may be formed of various types of material. For example and without limitation, the roller 28 is formed with a wear resistant material, the roller 28 is formed with a wear resistant metal alloy, the roller 28 is formed with a hot worked and spinodally hardened spinodal copper nickel tin alloy, the roller 28 is formed with ToughMet®3 AT110 and the like.

In embodiments, each non-rotating washer 29 includes a protrusion 50, wherein the protrusion 50 engages an inner surface of the spider 24 to prevent rotation of each of the non-rotating washers 29. Additionally, each non-rotating washer may have a flat edge surface 52, wherein the flat edge surface 52 allows the roller 28 to extend beyond the flat edge surface 52 of the washer 29 to prevent engagement of the flyweight 26 with each of the non-rotating washers 29. The non-rotating washers 29 may be formed of high carbon spring steel. Further, the washer 29 may include an aperture 54 that operates to receive the pin 40 there through to couple the non-rotating washer 29 to the spider 24.

The non-rotating washer 29 is critical for the protection of the aluminum spider 24 of the CVT clutch 10. Lateral impact from the flyweights 26 to the roller 28 are minimized by the stainless steel. The non-rotating washer 29 is designed to stop rotation during operation of the roller 28 during power cycles to eliminate wear and eliminate impact from the flyweight 26 during flyweight bushing failure occurrences.

Figure 6:
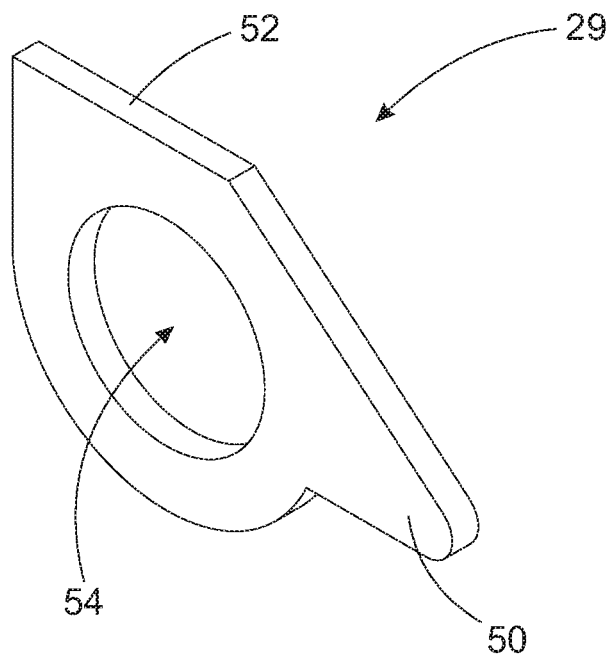
FIG. 6 is a perspective view of a non-rotating washer of a rebuild kit in accordance with an embodiment.
Figure 7:
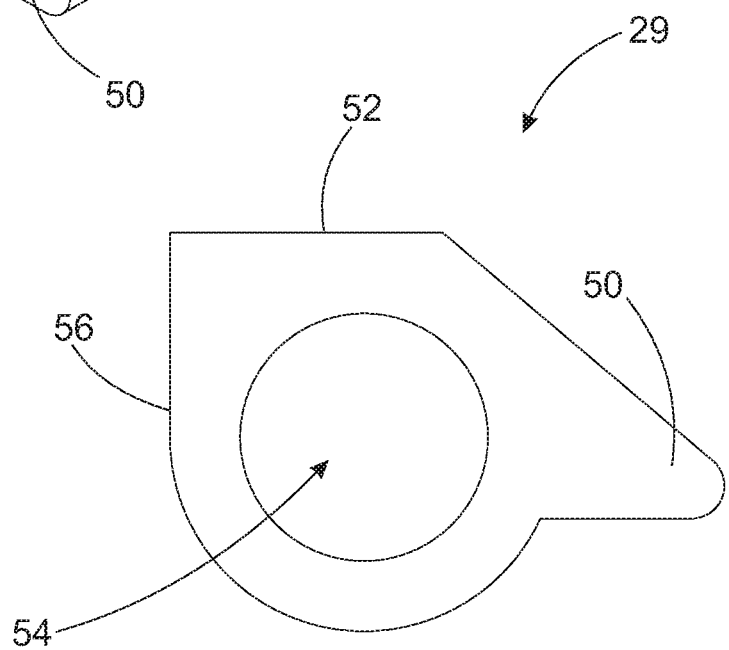
FIG. 7 is a side view of a non-rotating washer of a rebuild kit in accordance with an embodiment.

As shown in FIGS. 6 and 7, the non-rotating washers 29 may include a vertical flat edge surface 56 on an end opposite the protrusion 50. The vertical flat edge surface 56 operates to prevent rotation of the non-rotating washer 29 in a direction opposite of the rotation prevention provided by the protrusion 50.

It will be understood that the pin 40 may be formed of various types of material and various types of metal material. In the embodiments shown, the pin 40 may be formed of a high speed nitrited tool steel having a minimum Rockwell Hardness of 70.

Figure 8:
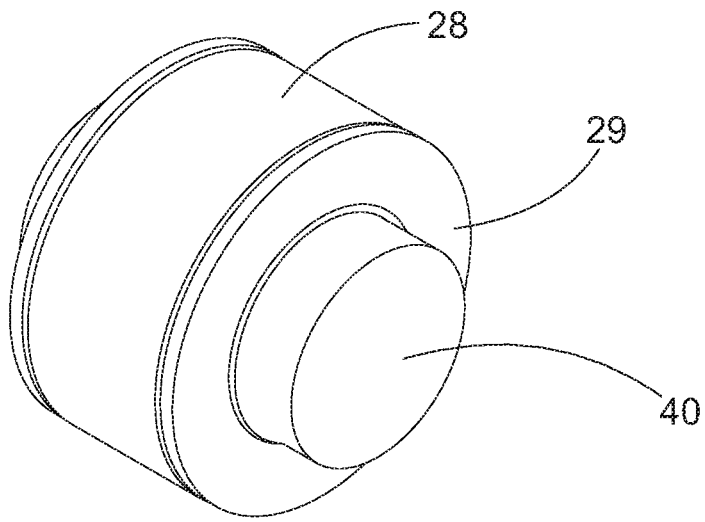
FIG. 8 is a perspective view of a roller and washers of a rebuild kit in accordance with an embodiment.
Figure 9:
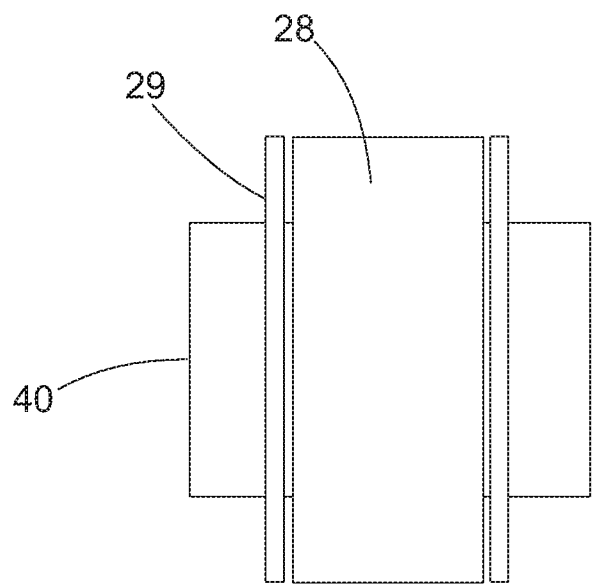
FIG. 9 is a top view of a roller, an insert and washers of a rebuild kit in accordance with an embodiment.
Figure 10:
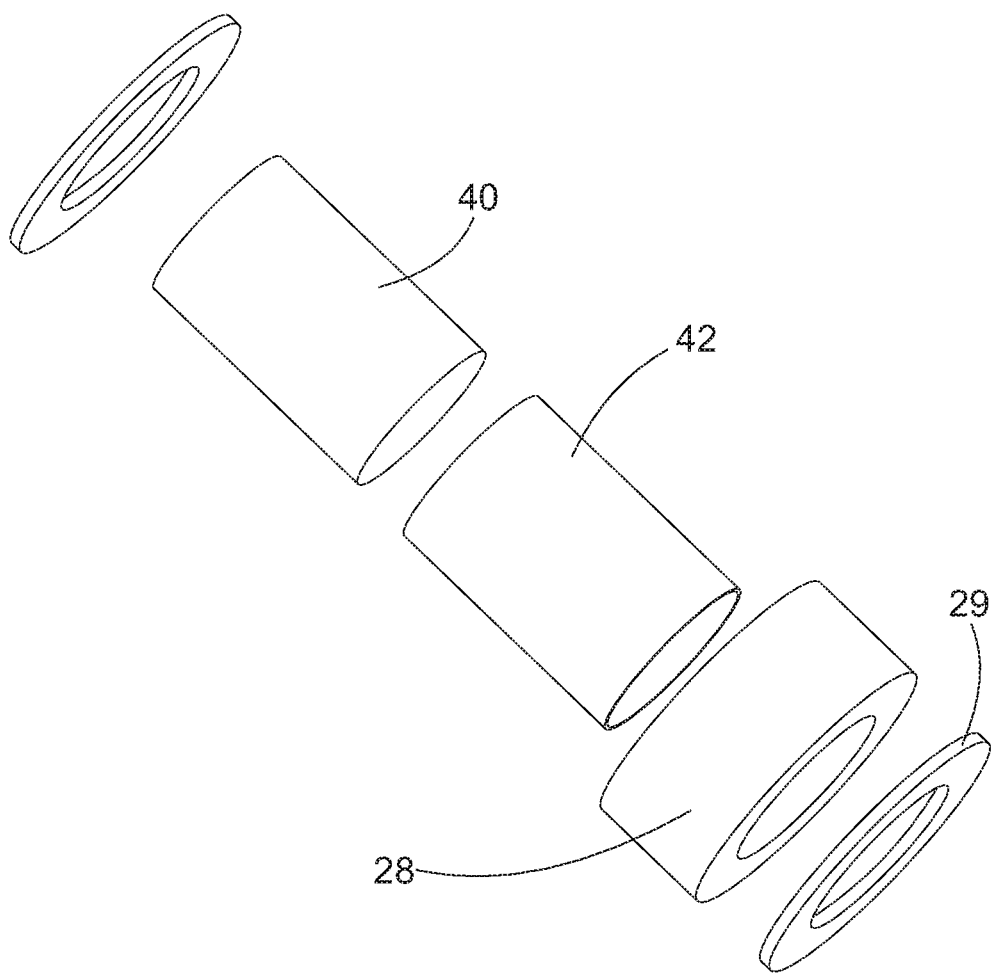
FIG. 10 is an exploded view of a roller, an insert and washers of a rebuild kit in accordance with an embodiment.

Other embodiments, depicted in FIGS. 8-10, may include rollers 28, washers 29 and a pin 40. The washers 29 may be rotating washers, which are useable if the wear of the spider is less than 0.015 inches. The roller 28 may also include an outer diameter equal to the maximum outer diameter determined by the manufacturer of the CVT clutch. This forces the spider 24 to operate the clutch 10 past its original maximum closed distance giving the vehicle a slightly higher top speed.

Also shown in FIGS. 8-10 is an insert 42 that is coupled within the aperture of the roller 28. The insert 42 may have high temperature resistance, a low coefficient of friction and non-adhesive properties. For example and without limitation, the insert 42 may be formed of polytetrafluoroethylene ("PTFE") The insert 42 formed of PTFE include at least the characteristics described above.

The embodiments and examples set forth herein were presented in order to best explain the present invention and its practical application and to thereby enable those of ordinary skill in the art to make and use the invention. However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in light of the teachings above without departing from the spirit and scope of the forthcoming claims.

The invention claimed is:

1. A rebuild kit for a spider assembly of a CVT clutch, the rebuild kit comprising:
   two non-rotating washers;
   a roller; and
   a spider having wear that is over an acceptable amount of wear determined by the manufacturer, wherein:
      a pin couples the two non-rotating washers and the roller between the non-rotating washers within the spider; and
      the roller is engaged by a flyweight of the CVT clutch and the non-rotating washers prevent additional wear of the spider while maintaining the roller aligned with the flyweight during operation of the CVT clutch.

2. The rebuild kit of claim 1, wherein the roller is formed with a wear resistant material.

3. The rebuild kit of claim 2, wherein the roller is formed with a wear resistant metal alloy.

4. The rebuild kit of claim 3, wherein the roller is formed with a hot worked and spinodally hardened spinodal copper nickel tin alloy.

5. The rebuild kit of claim 4, wherein the roller is formed with ToughMet®3 AT110.

6. The rebuild kit of claim 1, wherein each non-rotating washer comprises a protrusion, wherein the protrusion engages an inner surface of the spider to prevent rotation of each of the non-rotating washers.

7. The rebuild kit of claim 6, wherein each non-rotating washer comprises a flat edge surface, wherein the flat edge surface allows the roller to extend beyond the flat edge surface of the washer to prevent engagement of the flyweight with each of the non-rotating washers.

8. A rebuild kit for a spider assembly of a CVT clutch, the rebuild kit comprising:
   two non-rotating washers;
   a roller formed with a wear resistant material; and a spider, wherein:
a pin couples the two washers and the roller between the washers within the spider; and
the roller is engaged by a flyweight of the CVT clutch and the non-rotating washers prevent additional wear of the spider while maintaining the roller aligned with the flyweight during operation of the CVT clutch.

9. The rebuild kit of claim 8, wherein the roller is formed with a wear resistant metal alloy.

10. The rebuild kit of claim 9, wherein roller is formed with a hot worked and spinodally hardened spinodal copper nickel tin alloy.

11. The rebuild kit of claim 10, wherein roller is formed with ToughMet®3 AT110.

12. The rebuild kit of claim 8, wherein the roller includes an outer diameter equal to the maximum outer diameter determined by the manufacturer of the CVT clutch.

13. A rebuild kit for a spider assembly of a CVT clutch, the rebuild kit comprising:
two non-rotating washers;
a roller formed with a wear resistant material;
an insert having high temperature resistance, a low coefficient of friction and non-adhesive properties, wherein the insert is coupled within an aperture of the roller;
a spider, wherein:
a pin couples the two washers and the roller with the insert between the washers within the spider; and
the roller is engaged by a flyweight of the CVT clutch and the non-rotating washers prevent additional wear of the spider while maintaining the roller aligned with the flyweight during operation of the CVT clutch.

14. The rebuild kit of claim 13, wherein the roller is formed with a wear resistant metal alloy.

15. The rebuild kit of claim 14, wherein the roller is formed with a hot worked and spinodally hardened spinodal copper nickel tin alloy.

16. The rebuild kit of claim 15, wherein the roller is formed with ToughMet®3 AT110.

17. The rebuild kit of claim 13, wherein the roller includes an outer diameter equal to the maximum outer diameter determined by the manufacturer of the CVT clutch.

18. The rebuild kit of claim 13, wherein the insert if formed of polytetrafluoroethylene.

* * * * *